United States Patent [19]
Aspinwall et al.

[11] 3,879,289
[45] Apr. 22, 1975

[54] POWER TRANSMISSION

[75] Inventors: Ronald A. Aspinwall, Detroit; MacKellar K. Graham, Birmingham, both of Mich.

[73] Assignee: Sperry Rand Corporation, Troy, Mich.

[22] Filed: July 25, 1973

[21] Appl. No.: 382,405

[52] U.S. Cl. .................................. 210/90; 210/130
[51] Int. Cl. ............................................ B01d 27/10
[58] Field of Search ............... 210/90, 91, 130–133, 210/352, DIG. 14

[56] References Cited
UNITED STATES PATENTS

| | | | |
|---|---|---|---|
| 2,729,339 | 1/1956 | McCoy | 210/90 |
| 3,314,542 | 4/1967 | Kudlaty | 210/130 |
| 3,464,556 | 9/1969 | Cullen | 210/90 |
| 3,501,005 | 3/1970 | Russo et al. | 210/90 |
| 3,545,616 | 12/1970 | Aspinwall et al. | 210/90 |

*Primary Examiner*—John Adee
*Assistant Examiner*—Robert H. Spitzer
*Attorney, Agent, or Firm*—Theodore Van Meter

[57] ABSTRACT

A filter includes a cylindrical filter element which is arranged to normally have fluid passed therethrough. A linear bypass valve opens in response to a predetermined pressure drop through the filter element and operates an indicator when the valve is opened. A spring within the filter element holds the valve closed at other times. A second spring opens the valve when the filter element or the spring or both are omitted, thus causing the indicator to be shifted in the same manner as when the pressure drop across the element is too high. A compressor for the second spring holds it under stress by contact with the element, making the action of the bypass valve and the indicator independent of the second spring when the pressure drop through the element becomes excessive.

1 Claim, 3 Drawing Figures

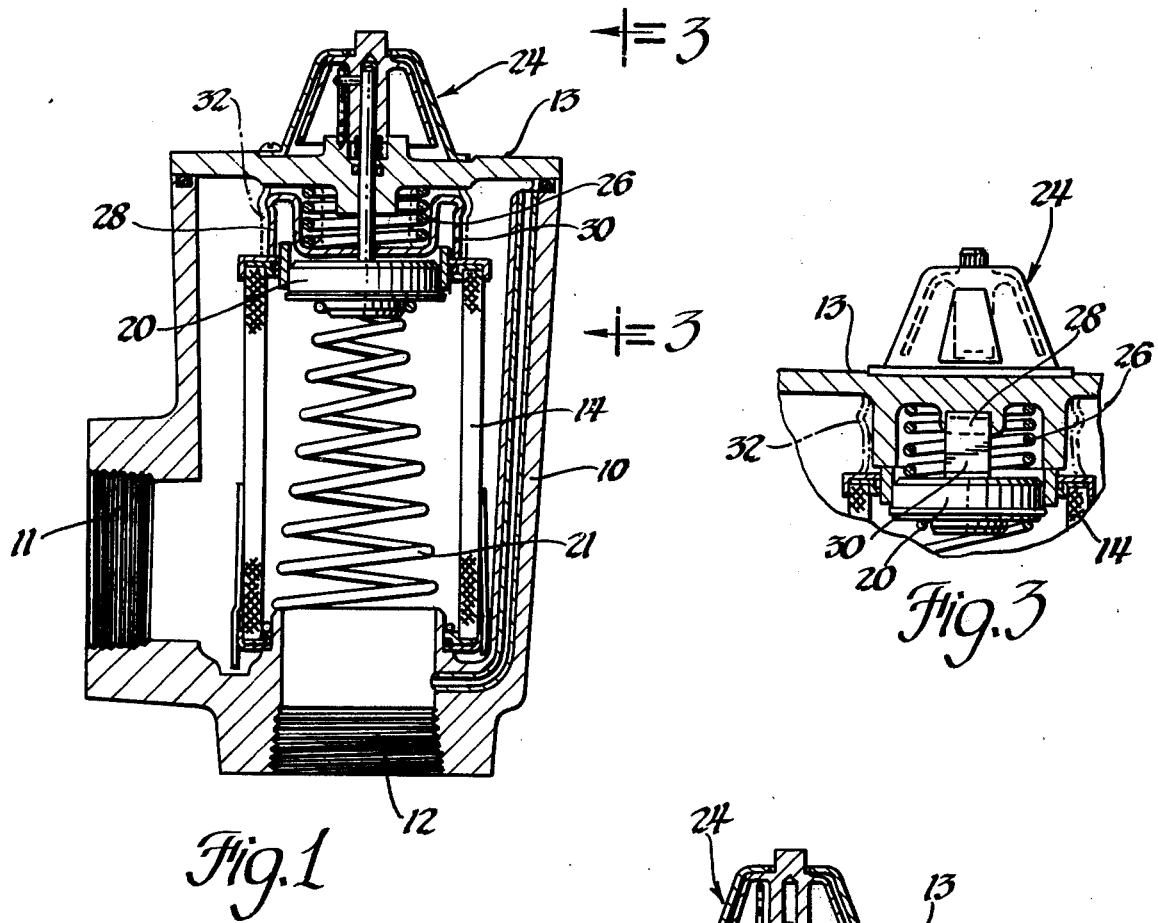
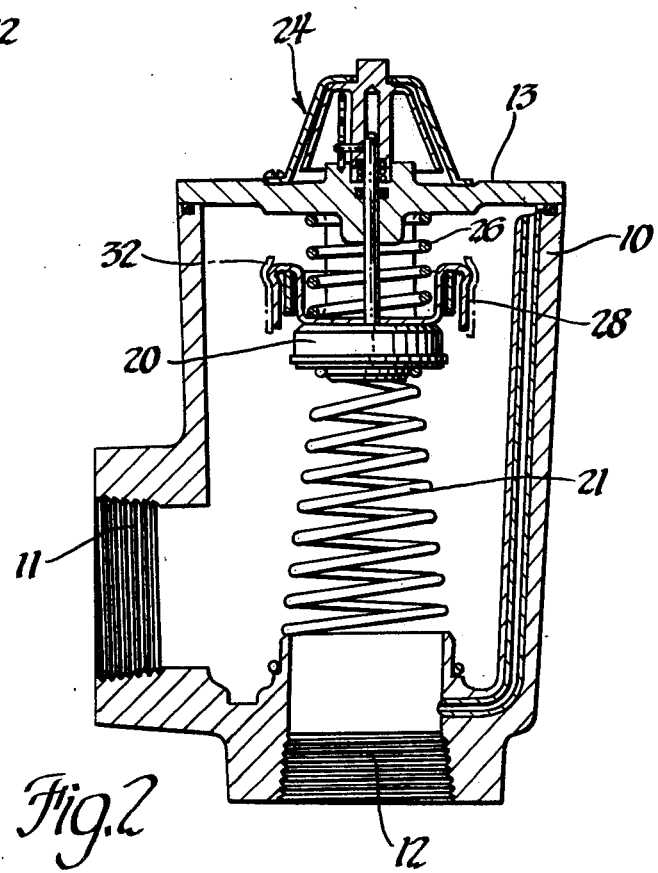

POWER TRANSMISSION

Many devices handling liquids at high pressure and which have close fitting precision manufactured parts depend upon reliable filtration to prevent wear caused by contaminants. It is customary to provide for this requirement by the provision of a cartridge type filter element which may be replaced when it becomes clogged. It is also common to provide a bypass valve which permits flow around a clogged element and this bypass valve may actuate an indicator to show when it is open. Such a device is illustrated in the patent to Aspinwall and Graham U.S. Pat. No. 3,545,616, Dec. 8, 1970.

It sometimes occurs that willfully or through negligent maintenance, the protection afforded by such devices may be frustrated with no indication that such a condition exists. This, of course, leads to rapid deterioration of the expensive machinery which the filter is designed to protect. Such a condition can arise, for example, when the filter is assembled with the element missing or with the bypass valve spring omitted, or with both conditions simultaneously.

It has been proposed to overcome this disadvantage by supporting the valve closing spring on the element itself and by providing an opposing spring at the bypass valve to open the same independently of pressure drop whenever either the element or the valve closing spring is omitted. See for example the pending application of Robert N. Mezger, Ser. No. 293,628, filed Sept. 29, 1972. In such devices, the inherent limitations upon the choice of force-displacement characteristics of the two springs become prohibitive in certain sizes of filter designs.

The present invention aims to overcome these difficulties by the provision of a means for holding the second spring stressed solely by contact with the filter cartridge element and entirely independently of the bypass valve closing spring.

This is achieved by the provision of a filter which comprises a housing member and a cover member, spaced inlet and outlet connections, a cylindrical filter cartridge interposed between the connections, a combined bypass valve and indicator mounted in one member and adjacent an end of the cartridge, a first spring in the cartridge biasing the valve to closed position, a second spring biasing the valve to open position, and means abutting a part of the cartridge for holding the second spring stressed independently of the force of the first spring, whereby if either the cartridge or the spring or both are removed, the valve and the indicator will be shifted to open position either by the second spring or by fluid pressure respectively.

IN THE DRAWING

FIG. 1 is a cross section of a filter incorporating a preferred form of the present invention.

FIG. 2 is a cross section corresponding to FIG. 1 showing the parts in a different position.

FIG. 3 is a fragmentary view, partly in section, looking in the direction of the arrows 3—3 in FIG. 1.

The disclosure of the foregoing patent to Aspinwall et al is referred to and incorporated as a part of the present disclosure. In the embodiment herein described, the same reference characters are used for the similar parts, such as the housing 10, inlet 11, outlet 12, cover 13, cartridge element 14, bypass valve 20, helical spring 21 and the indicating means 24. These parts all function in the same manner as described in Aspinwall et al, but with additional performance features. In addition, the present invention provides a second spring 26 for urging the bypass valve 20 open whenever the cartridge element 14 is missing. Spring 26 may be as strong as desired to insure positive actuation of the indicator 24. In order to free the action of the bypass valve 20 and spring 21 from any influence of the second spring 26, a spring compressor 28, which may be formed of strip metal stock, is provided to form a U-shaped cradle section for the spring 26 and to provide a pair of downwardly extending legs 30 which contact the upper end of the cartridge element 14. If desired, a circular screen 32 may be carried by the legs 30 for secondary protection when the element 14 becomes clogged.

In normal operation, the action is similar to that described in the Aspinwall patent and spring 21 is the sole force determining the fluid pressure drop which will open the bypass valve 20. In the event that the housing 10 and the cover 13 were to be assembled without an element present, such as the condition illustrated in FIG. 2, the spring 26 is then free to extend, thus actuating the indicator 24 showing that the filter device is not filtering the fluid which may pass through it. On the other hand, should the device be assembled without the spring 21 present even though a filter element is present, the bypass valve will open at the near zero pressure drop which exists across a fresh filter element and thus signal the existence of dangerous conditions.

I claim:

1. A filter comprising a housing member and a cover member, spaced inlet and outlet connections, a cylindrical filter cartridge interposed between the connections, a combined bypass valve and indicator mounted in one member and adjacent an end of the cartridge, means extending through the one member for converting longitudinal motion of the valve into rotary motion of the indicator, a first spring in the cartridge biasing the valve to closed position, a second spring capable of moving the valve to open position, and means abutting a part of the cartridge for holding the second spring stressed independently of the force of the first spring whereby if either the cartridge or the first spring or both are removed, the valve and the indicator will be shifted to open position by the fluid pressure drop or by the second spring respectively.

* * * * *